United States Patent
Boyd

(10) Patent No.: US 9,681,209 B2
(45) Date of Patent: Jun. 13, 2017

(54) METHOD AND SYSTEM FOR SCHEDULING REMOTE PONS CONNECTED VIA AN ETHERNET SWITCH

(71) Applicant: Tibit Communications, Inc., Petaluma, CA (US)

(72) Inventor: Edward W Boyd, Petaluma, CA (US)

(73) Assignee: TIBIT COMMUNICATIONS, INC., Petaluma, CA (US)

(*) Notice: Subject to any disclaimer, the term of this patent is extended or adjusted under 35 U.S.C. 154(b) by 2 days.

(21) Appl. No.: 14/825,001

(22) Filed: Aug. 12, 2015

(65) Prior Publication Data
US 2016/0050471 A1 Feb. 18, 2016

Related U.S. Application Data

(60) Provisional application No. 62/036,570, filed on Aug. 12, 2014.

(51) Int. Cl.
*H04Q 11/00* (2006.01)
*H04B 10/27* (2013.01)

(52) U.S. Cl.
CPC ......... *H04Q 11/0067* (2013.01); *H04B 10/27* (2013.01); *H04Q 11/0005* (2013.01); *H04Q 2011/0016* (2013.01); *H04Q 2011/0052* (2013.01); *H04Q 2011/0064* (2013.01)

(58) Field of Classification Search
CPC .................................. H04Q 11/0067
See application file for complete search history.

(56) References Cited

U.S. PATENT DOCUMENTS

| | | | | |
|---|---|---|---|---|
| 2004/0028405 A1* | 2/2004 | Unitt | ................ | H04B 10/272 398/32 |
| 2004/0101302 A1* | 5/2004 | Kim | ................ | H04J 14/0245 398/45 |
| 2012/0294611 A1* | 11/2012 | Adler | ................ | H04Q 11/0067 398/45 |

* cited by examiner

*Primary Examiner* — Nathan Curs
(74) *Attorney, Agent, or Firm* — Shun Yao; Park, Vaughan, Fleming & Dowler LLP

(57) ABSTRACT

One embodiment provides an apparatus for coupling a trunk network to a plurality of leaf passive optical networks (PONs). The apparatus includes one or more uplink ports for coupling to the trunk network, a plurality of downlink ports with a respective downlink port coupled to a leaf PON, and a switch chip for interconnecting the uplink ports and the downlink ports. The switch chip acts as a simple Ethernet switch with no traffic control ability.

22 Claims, 10 Drawing Sheets

| | |
|---|---|
| PREAMBLE (LLID+CRC) | 8 OCTETS |
| DESTINATION ADDRESS | 6 OCTETS |
| SOURCE ADDRESS | 6 OCTETS |
| ETHERTYPE=0x8808 | 2 OCTETS |
| OP CODE | 2 OCTETS |
| TIMESTAMP | 4 OCTETS |
| DATA/PAD | |
| FCS | 4 OCTETS |

FIG. 3A

METHOD AND SYSTEM FOR SCHEDULING REMOTE PONS CONNECTED VIA AN ETHERNET SWITCH

RELATED APPLICATIONS

This application hereby claims priority under 35 U.S.C. §119 to U.S. Provisional Patent Application No. 62/036,570, filed on 12 Aug. 2014, entitled "PON Controlled Aggregation: Scheduling Method," by inventor Edward W. Boyd.

This application is also related to U.S. patent application Ser. No. 14/684,164, entitled "Method and System for Scheduling Cascaded PON," filed 10 Apr. 2015 by inventor Edward W. Boyd, the disclosure of which is incorporated herein by reference in its entirety for all purposes.

BACKGROUND

Field of the Invention

This disclosure is generally related to extended Ethernet passive optical networks (PONs). More specifically, this disclosure is related to a method and a system for aggregating a plurality of PONs using low-cost and low-power Ethernet switches with limited buffering and traffic management capabilities.

Related Art

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering high bandwidth to end users.

Among different competing technologies, Ethernet passive optical networks (EPONs) are one of the best candidates for next-generation access networks. EPONs combine ubiquitous Ethernet technology with inexpensive passive optics, offering the simplicity and scalability of Ethernet with the cost-efficiency and high capacity of passive optics. With the high bandwidth of optical fibers, EPONs can accommodate broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. The "first mile" is generally a logical point-to-multipoint network, where a central office serves a number of subscribers. For example, an EPON can adopt a tree topology, wherein one trunk fiber couples the central office to a passive optical splitter/combiner. Through a number of branch fibers, the passive optical splitter/combiner divides and distributes downstream optical signals to subscribers and combines upstream optical signals from subscribers (see FIG. 1).

Transmissions within an EPON are performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. An ONU can reside either at the curb or at an end-user location, and can provide broadband voice, data, and video services. ONUs are coupled to a one-by-n (1×n) passive optical coupler, where n is the number of ONUs, and the passive optical coupler is coupled to the OLT over an optical link. One may use a number of cascaded optical splitters/couplers to increase the number of ONUs. This configuration can significantly save on the number of fibers and amount of hardware.

Communications within an EPON include downstream traffic and upstream traffic. In the following description, "downstream" refers to the direction from an OLT to one or more ONUs, and "upstream" refers to the direction from an ONU to the OLT. In the downstream direction, because of the broadcast nature of the 1×n passive optical coupler, data packets are broadcast by the OLT to all ONUs and are selectively extracted by their destination ONUs. Moreover, each ONU is assigned one or more logical link identifiers (LLIDs), and a data packet transmitted by the OLT typically specifies the LLID of the destination ONU. In the upstream direction, the ONUs need to share channel capacity and resources, because there is only one link coupling the passive optical coupler to the OLT.

Due to the limitations on optical power budget and fiber availability, in many cases, extended PONs with longer reaches and higher densities are needed. In many cases, multiple remote PONs can be connected to a trunk (or uplink) port via an Ethernet switch. In such scenarios, scheduling the upstream traffic from the multiple downstream PONs can be a challenge.

SUMMARY

One embodiment provides an apparatus for coupling a trunk network to a plurality of leaf passive optical networks (PONs). The apparatus includes one or more uplink ports for coupling to the trunk network, a plurality of downlink ports with a respective downlink port coupled to a leaf PON, and a switch chip for interconnecting the uplink ports and the downlink ports. The switch chip acts as a simple Ethernet switch with no traffic control.

In a variation on this embodiment, a respective uplink port couples to an integrated optical network unit (ONU) module that includes an ONU transceiver, an ONU media access control (MAC) module, an optical line terminal (OLT) MAC module, and an on-chip memory.

In a further variation, the OLT MAC module is configured to schedule upstream traffic for the leaf PONs.

In a further variation, the downlink port couples to an integrated optical line terminal (OLT) module that includes an OLT transceiver, an optical network unit (ONU) media access control (MAC) module, an OLT MAC module, and an on-chip memory.

In a variation on this embodiment, a respective uplink port couples to a wavelength-division-multiplexing (WDM) transceiver. The WDM transceiver is connected, via the switch chip, to multiple downlink modules plugged into multiple downlink ports, and a downlink module acts as a master over other downlink modules.

In a further variation, the master downlink module is configured to schedule upstream traffic for leaf PONs coupled to the other downlink modules.

In a variation on this embodiment, the trunk network includes one or more of: a point-to-point Ethernet link between a central office and an outside plant, a PON between a central office and an outside plant, and a link within a central office.

In a variation on this embodiment, the simple Ethernet switch is configured to switch a modified Multi-Point Control Protocol (MPCP) control frame based on one of: a multicast destination address included in the modified MPCP control frame, and a unicast destination address included in the modified MPCP control frame.

In a further variation, the modified MPCP control frame has an Ethertype that is different from an Ethertype of a conventional MPCP control frame.

In a further variation, the unicast destination address includes a logical link identifier (LLID) associated with a downlink module coupled to a downlink port.

In a further variation, the modified MPCP control frame further includes a virtual local area network (VLAN) tag field that includes an LLID associated with a downlink module coupled to a downlink port.

In a further variation, the modified MPCP control frame includes a bandwidth request sent from a leaf PON, and the modified MPCP control frame includes a time field that indicates a degree of urgency of the bandwidth request

BRIEF DESCRIPTION OF THE FIGURES

FIG. 3A presents a diagram illustrating an exemplary frame format of a conventional Multi-Point Control Protocol (MPCP) control message.

In the figures, like reference numerals refer to the same figure elements.

DETAILED DESCRIPTION

Overview

Embodiments of the present invention provide a solution for scheduling multiple remotely connected PONs (also called leaf PONs) in the presence of an Ethernet switch. More specifically, the scheduling can be achieved via media access control (MAC) frames that are modified EPON GATE and REPORT messages. In order to pass through the Ethernet switch, which blocks standard PON GATE and REPORT messages, the modified GATE and REPORT frames have a different Ethertype and carry the LLIDs in a VLAN (virtual local area network) tag or in a MAC address field. An OLT scheduler, which can be part of the trunk port or a leaf port, schedules upstream transmission using modified GATE messages based on received modified REPORT messages. Moreover, a modified REPORT message from a leaf PON aggregates LLIDs belonging to the same class of service. As a result, the trunk side only needs to schedule for each class of service instead of for each LLID. A bridge device with a low-cost Ethernet switch and a plurality of pluggable modules can be used to implement such a solution.

A Bridge with an Ethernet Switch

Figure 1:
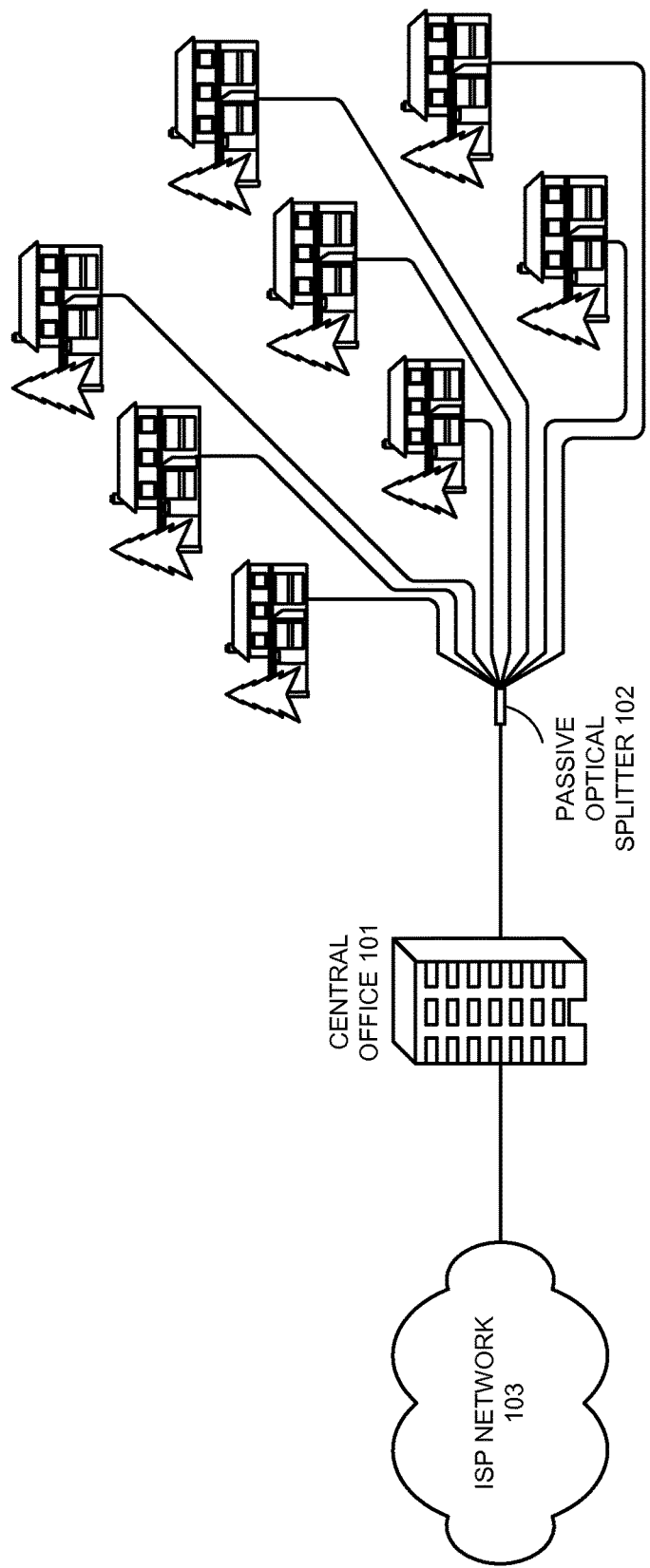
FIG. 1 illustrates an EPON, wherein a central office and a number of subscribers are coupled through optical fibers and a passive optical splitter (prior art).

FIG. 1 illustrates an EPON including a central office and a number of subscribers coupled through optical fibers and a passive optical splitter (prior art). A passive optical splitter 102 and optical fibers couple the subscribers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus.

If passive optical splitter 102 has a 1:32 power split ratio, the optical power budget and the passive nature of the PON limits the distance between central office 101 and the ONUs to no more than 20 km. However, many networks require a greater distance (which can be up to 150 km in a cable network) between the operator facility and the subscribers. In addition, in many cases, the number of trunk fibers that connect the subscribers to the operator network is limited, thus limiting the total number of subscribers supported by the network. Therefore, it is desirable to provide a solution that can extend the reach of the PON and increase the PON density.

One solution for extending the reach or increasing the density of the PON is to employ a bridge device that enables either the cascading of multiple PON stages or point-to-point Ethernet backhauling of multiple remote PONs. For cascaded EPON networks, a PON-to-PON bridge that includes one or more pluggable integrated OLT modules (i.e., an OLT module with both the OLT and ONU MAC) can be used to connect a trunk side PON to one or more leaf side PONs. On the other hand, Ethernet backhauling (e.g., point-to-point link via WDM (Wavelength-Division Multiplexing)) of multiple remote PONs may require an Ethernet switch to be incorporated inside the bridge device.

Figure 2:
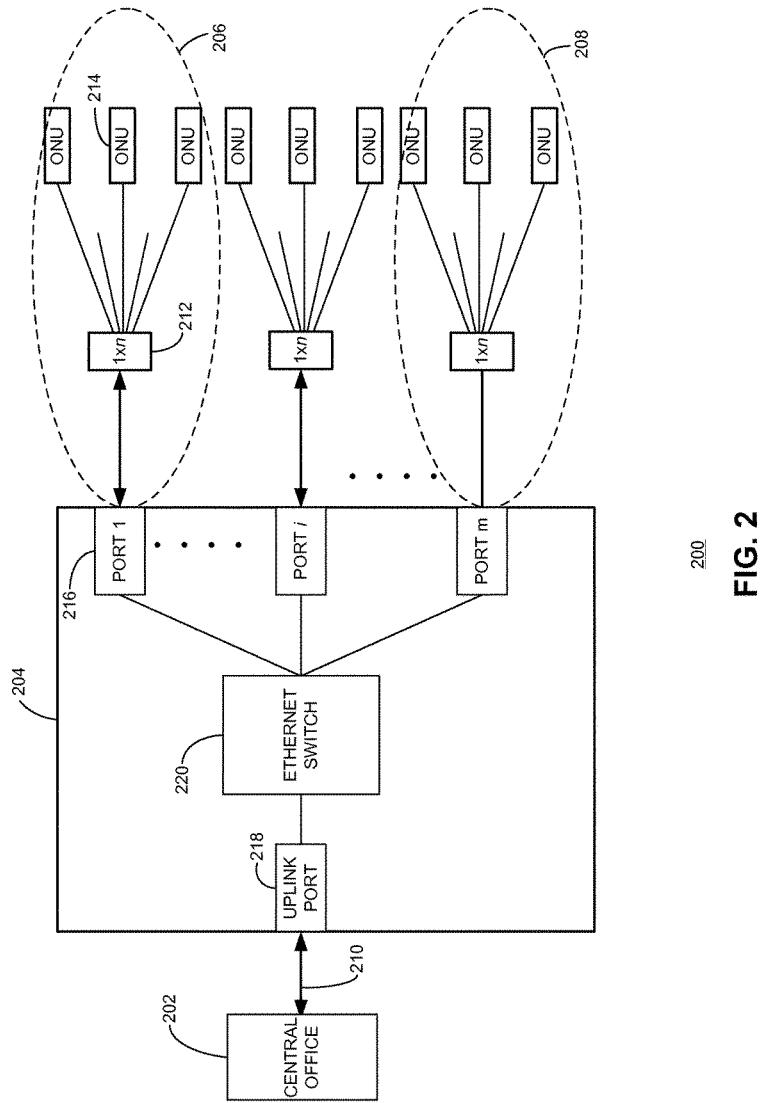
FIG. 2 presents a diagram illustrating the exemplary coupling between multiple remote PONs and an uplink port via an Ethernet switch, in accordance with an embodiment of the present invention.

FIG. 2 presents a diagram illustrating the exemplary coupling between multiple remote PONs and an uplink port via an Ethernet switch, in accordance with an embodiment of the present invention. In FIG. 2, a network 200 includes a central office 202, a bridge device 204, and a plurality of PONs, such as PONs 206 and 208. Bridge device 204 couples to central office 202 via a link 210, which can include a WDM-based point-to-point Ethernet link or part of a PON. Link 210 can also be referred to as a "trunk" link, and if link 210 is part of a PON, such a PON can be referred to as a "trunk" PON. The downstream PONs can be referred to as "leaf" PONs. Each leaf PON includes an OLT (which is embedded in bridge 204), a passive optical splitter, and a number of ONUs coupled to the passive optical splitter. For example, in FIG. 2, leaf PON 206 includes an OLT (not shown) embedded in bridge 204, a 1×n passive optical splitter 212, and a number of ONUs, such as ONU 214. Each leaf PON couples to a downlink port (e.g., port 216) of bridge 204, and the plurality of downlink ports is coupled to uplink port 218 of bridge 204 via an Ethernet switch 220.

As one can see from FIG. 2, the reach of the PONs can be extended by link 210. If link 210 is a point-to-point Ethernet link, the distance from central office 202 to the ONUs, such as ONU 214, can be greater than 100 km, thus significantly extending the reach of the PONs. Moreover, this architecture can support many more ONUs, and hence customers, than a conventional PON. For example, link 210 can be a CWDM (Coarse Wavelength Domain Multiplex) or a DWDM (Dense Wavelength Domain Multiplex) link with multiple wavelength channels, and each wavelength channel can correspond to a downlink port. Alternatively, bridge 204 can include a PON within, with the uplink port including an OLT and the downlink ports including ONUs. The number of customers supported by network 200 can be determined by the split ratio of the leaf PONs, and the number of downlink ports on bridge device 204. If the split ratio of the leaf PONs is 32 and bridge device 204 includes 32 downlink ports, then network 200 can support up to 32×32=1024 customers.

As one can see from FIG. 2, incorporating Ethernet switch 220 within bridge device 204 enables Ethernet backhauling of the remote PONs. However, there are challenges facing such architecture, especially in the upstream direction where traffic from the leaf ONUs is often oversubscribed to uplink port 218. The oversubscribed upstream traffic may cause congestion at uplink port 218, and the congested uplink port can lead to overflow at Ethernet switch 220. In addition, if the uplink module (a module plugged into uplink port 218) is a PON ONU, the upstream bandwidth can also be limited by the PON. Therefore, without buffering or flow control, upstream packets will be dropped at Ethernet switch 220 or the uplink ONU.

One solution to prevent upstream packet loss is to build Ethernet switch 220 using a large traffic management chip with external memories. The external memories can be used to buffer the uplink traffic, and Ethernet flow control provided by the traffic management chip can be used to flow control the leaf PONs. However, this solution has a number of drawbacks. First, to ensure fairness among subscribers, the switch may need to provide buffering for each subscriber and each class of service, meaning that large memories will be needed. Second, Ethernet flow control may result in significant delay and jitter of the upstream data. More specifically, the long loop time in the leaf PONs can cause a significant amount of data to remain in transit when the flow control is issued. In general, traffic management switches with large external memories can cost more and consume more power than simpler switches. Considering that the bridge device is typically located outside of the central office, it is desirable to use a low-cost low-power switch, such as a switch with internal buffer and limited queues. However, the limited queues mean that congestion may occur on the uplink port, which can then lead to packet loss. In other words, a bridge device using the low-cost low-power Ethernet switch cannot provide guaranteed services and traffic differentiation without packet loss.

In addition to Ethernet flow control, one may also consider using Multi-Point Control Protocol (MPCP) to manage upstream traffic at the bridge. MPCP is a protocol used by EPON for upstream traffic control. More specifically, MPCP uses MAC messages (e.g., REPORT and GATE) to control upstream transmission of the ONUs. Because an ONU is not allowed to transmit unless the uplink port has bandwidth for the ONU, there is no need for excessive buffering at the bridge. However, the bridge cannot adopt the EPON MPCP directly, because the MPCP control frames cannot be transferred through the Ethernet switch inside the bridge. More specifically, the Ethertype for MPCP control frames (e.g., REPORT, GATE, etc.) is set as 0x8808, which is the same as the Ethertype of the Ethernet flow control messages (e.g., PAUSE), and typical Ethernet switches are configured to not forward such messages. Moreover, a standard Ethernet frame preamble cannot carry the LLID field required by the MPCP protocol for identifying the ONU.

To provide a low-cost, low-power solution for a remote PON bridge with an Ethernet switch, embodiments of the present invention use modified MPCP control frames to control upstream traffic. The use of the modified MPCP control frames scheduled from the uplink port prevents congestion in the switch, and allows a low-cost Ethernet switch, which has no traffic management capability, to be embedded in the bridge.

FIG. 3A presents a diagram illustrating an exemplary frame format of a conventional MPCP control message. In FIG. 3A, a conventional MPCP control frame include an 8-byte preamble field, a 6-byte DA (destination address) field, a 6-byte SA (source address) field, a 2-byte Ethertype field, a 2-byte op-code field, a 4-byte timestamp field, a data field (with optional padding), and a 4-byte FCS (frame check sequence) field. As discussed previously, the Ethertype field of the MPCP control frame is set as 0x8808, which can cause the Ethernet switch not to forward the frame. To allow such frames to pass an Ethernet switch, the Ethertype field needs to be set to a different value. In a conventional MPCP control frame, the DA field is set to a fixed multicast address (0x01-80-c2-00-00-01) that does not identify the destination of the control frame. As one can imagine, such a frame cannot pass through an Ethernet switch because the destination of the frame is not identified by its DA field.

Different from other types of Ethernet frame, the preamble field of an MPCP frame includes an LLID (which is two bytes long). In the downstream direction, the LLID included in the preamble identifies the destination ONU; and in the upstream direction, the LLID identifies the ONU sending the frame. However, even if the MPCP frame can be forwarded by the Ethernet switch, the LLID included in the preamble will not be able to pass the Ethernet switch, which automatically strips off the preamble upon receiving the frame. Hence, to relay information associated with the destination or originating ONU of an MPCP control frame, the LLID needs to be placed at a different location.

Figure 3B:
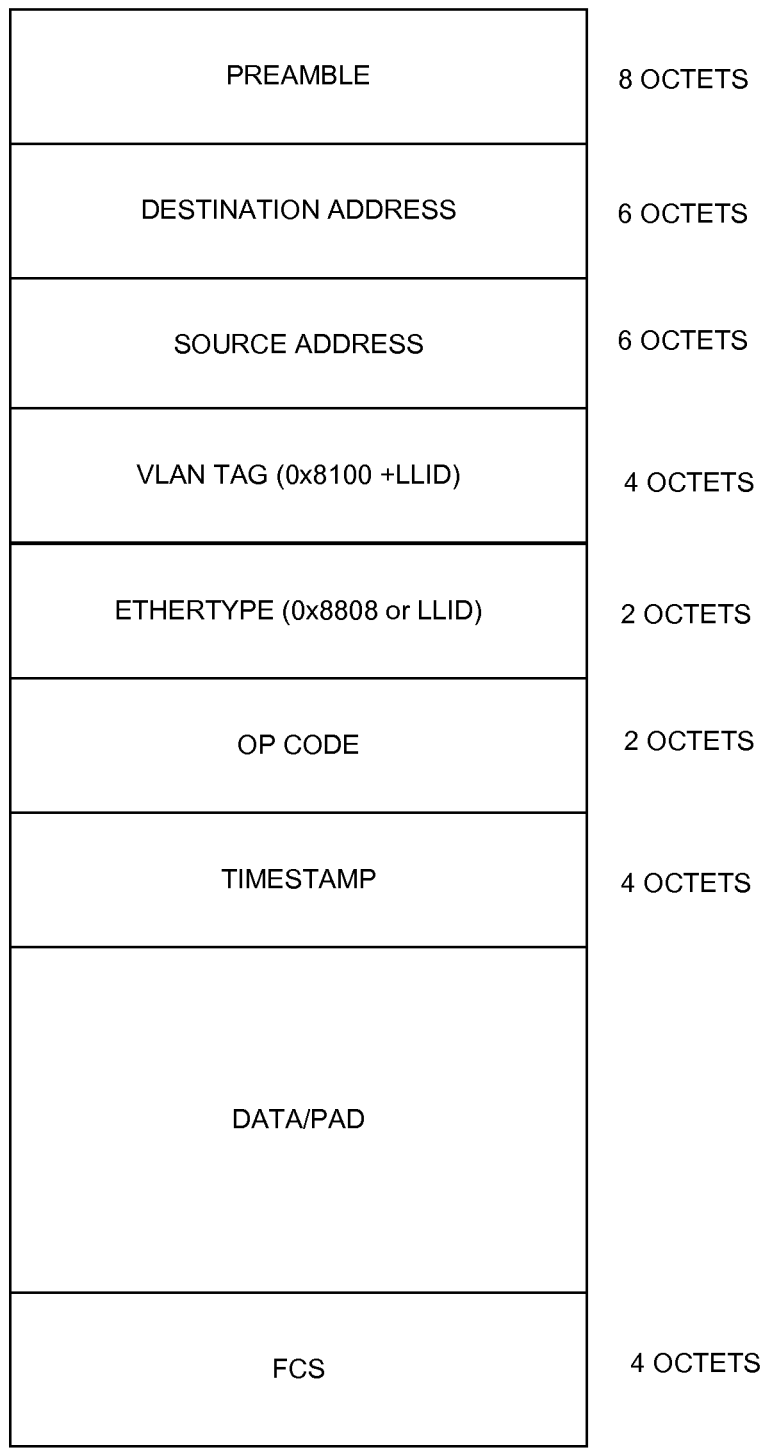
FIG. 3B presents a diagram illustrating an exemplary frame format of a modified MPCP control message, in accordance with an embodiment of the present invention.

FIG. 3B presents a diagram illustrating an exemplary frame format of a modified MPCP control message, in accordance with an embodiment of the present invention. Compared with the frame format shown in FIG. 3A, the modified MPCP control frame shown in FIG. 3B is a VLAN-tagged frame with a 4-byte VLAN tag field inserted between the SA field and the Ethertype field. The first two bytes of the VLAN tag field are located at the same position as the Ethertype field in the untagged frame shown in FIG. 3A and are set as 0x8100 to indicate that this frame is VLAN-tagged. For VLAN applications, the last two bytes of the VLAN tag field typically carry tag control information (TCI). In some embodiments of the present invention, the last two bytes of the VLAN tag field carry the LLID associated with the frame. The original Ethertype field can remain unchanged, or alternatively, the LLID can be carried in the original Ethertype field.

Figure 3C:
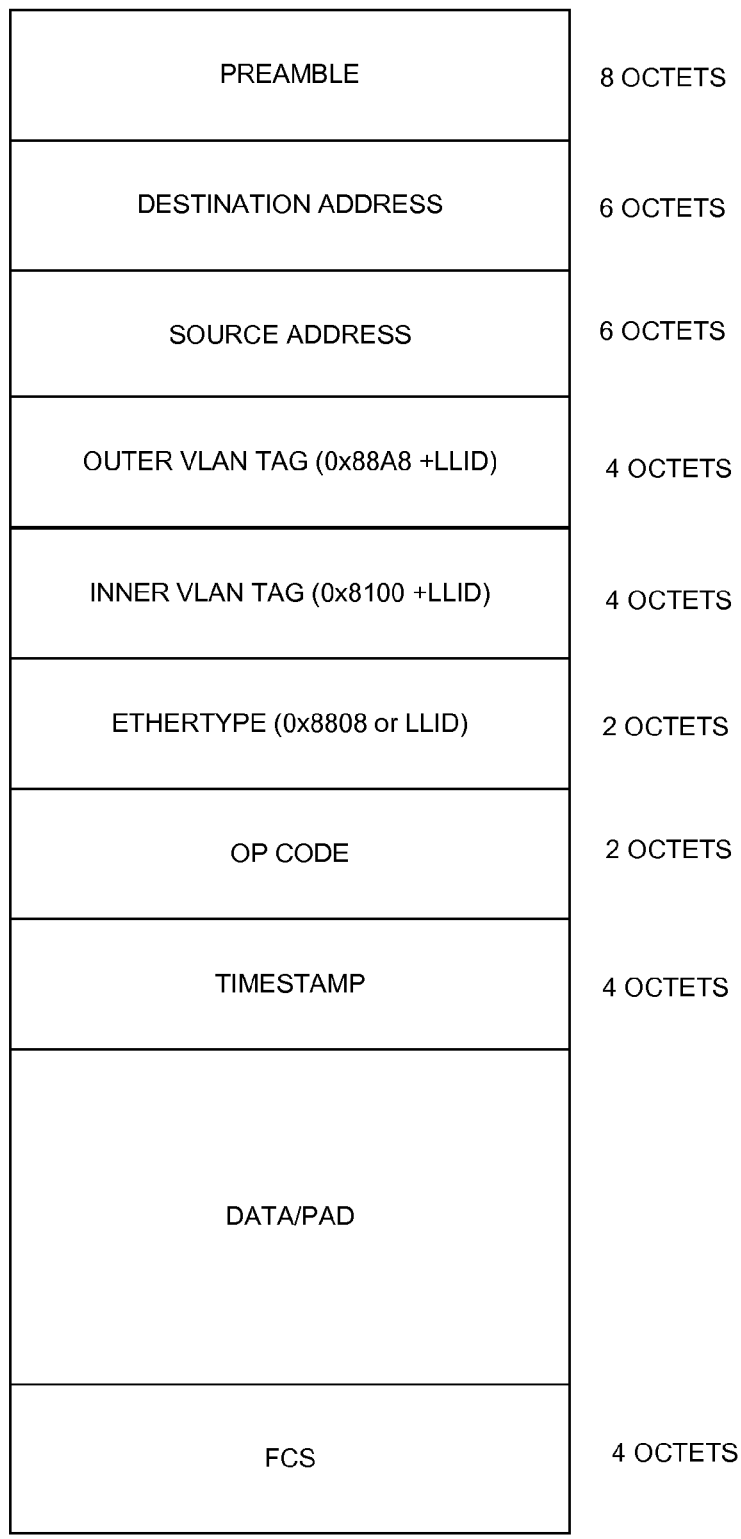
FIG. 3C presents a diagram illustrating an exemplary frame format of a modified MPCP control message, in accordance with an embodiment of the present invention.

In addition to the single-tagged frame shown in FIG. 3B, the modified MPCP control frame may be a doubled-tagged frame, as shown in FIG. 3C. The double-tagged frame includes an outer VLAN tag (i.e., the Service tag) and an inner VLAN tag (i.e., the Customer tag). The first two bytes of the outer VLAN tag field are located at the same position as the Ethertype field in the untagged frame shown in FIG. 3A and are set as 0x88A8 to indicate that this frame is a double-tagged frame. The first two bytes of the inner VLAN tag field remain the same as those of the single-tagged frame. The LLID associated with the frame can be carried by the last two bytes of the outer VLAN tag, the last two bytes of the inner VLAN tag, or the original Ethertype field.

Note that using the VLAN tag field (either the Service tag or the Customer tag) to carry the LLID ensures that the LLID information can be relayed past the Ethernet switch. However, the insertion of the VLAN tag(s) extends the length of the MPCP control frames, thus increasing the control bandwidth overhead.

Figure 3D:
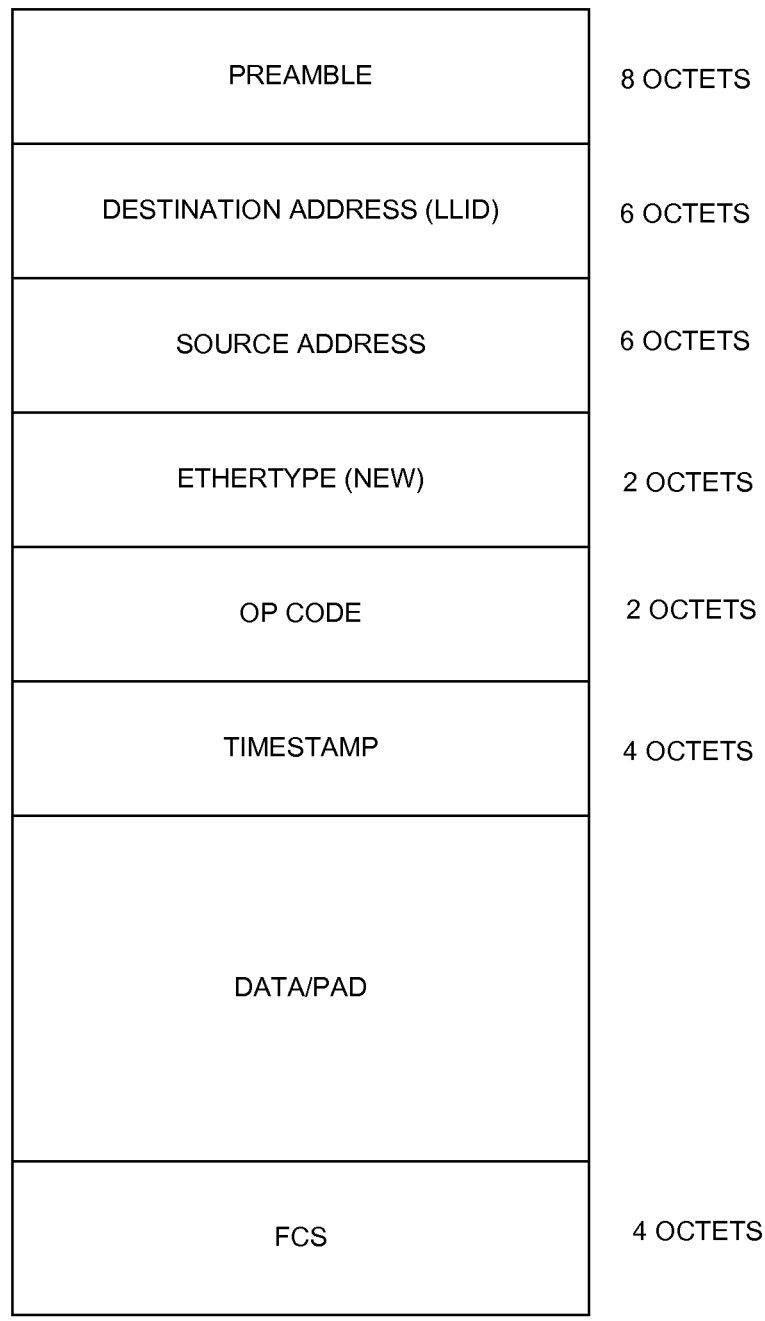
FIG. 3D presents a diagram illustrating an exemplary frame format of a modified MPCP control message, in accordance with an embodiment of the present invention.

In addition to using VLAN tag(s) to carry the LLID, in some embodiments of the present invention, the LLID can be carried in the DA (destination address) field of the modified MPCP frame. In the conventional MPCP control frame shown in FIG. 3A, the DA field carries a reserved multicast MAC address 01-80-C2-00-00-01, as defined by IEEE Standard 802.3x. However, a standard Ethernet switch cannot process or forward traffic to such a multicast address. In some embodiments, the DA field of a modified MPCP control frame can carry a unicast MAC address, which can be used to indicate the LLID of the destination module. In other words, the LLID is now carried in the DA field, as shown in FIG. 3D. Note that, if the LLID is carried in the DA field, there is no need to insert VLAN tags. As a result, the Ethertype field needs to be set to a new value (which indicates a new MAC control protocol type) in order to allow the control frame to pass the Ethernet switch. This new Ethertype value can be reserved for the application of the extended PON, and the Ethernet switch can be configured to recognize such a new MAC control protocol type. By carrying the LLID in the DA field, the modified MPCP control frames are compatible with standard Ethernet switches and do not occupy more bandwidth than conventional MPCP control frames. In the upstream direction, the LLID in the preamble identifies the ONU sending the control frame. Accordingly, the LLID of the ONU sending the frame can be carried in the SA filed of the modified MPCP control frame.

In addition to changing the Ethertype and moving the LLID out of the preambles, in some embodiments, the content of the modified MPCP frames (included in the DATA/PAD field) can also be modified. More specifically, in a modified REPORT frame, instead of just reporting the queue status (in terms of byte counts) of an ONU, the DATA field in the modified REPORT frame can also include times values (relative to the MPCP timestamp included in the TIMESTAMP field) that indicate the scheduling urgencies. These time values (which can be referred to as "expected-transmission-times") indicate to the scheduler when should a bandwidth request be granted to meet the minimum bandwidth requirement. More specifically, the queue report for each queue can include two parts, one is the expected-transmission-time and the other is the conventional byte count for the queue. The expected-transmission-time of a particular LLID indicates the estimated time that the LLID should be serviced. Each time the LLID transmits, the expected-transmission-time advances to a future time based on a weight factor (which can be determined by the class of service) and the amount of data transmitted. Note that the expected-transmission-time is not the actual time that the LLID has to transmit (which most likely will occur at a later time) but can be the optimal time of transmission for that LLID. When the scheduler residing on an OLT receives modified REPORTs from various ONUs, the scheduler can select the ONU with the most urgent expected-transmission-time to schedule transmission. Note that, although adding the expected-transmission-time field in the modified MPCP control can result in a longer frame, this added control overhead can be outweighed by the scheduling benefit provided by this additional field.

The modified MPCP control frames can also be used for the discovery of the switch LLIDs. Similar to the MPCP discovery process in conventional PONs, an OLT can send out a modified discovery GATE, which can have a broadcast MAC address (or a directed one) and the new MAC Control protocol type, to look for new stations. Typically there will be no issue with contention, because the switch buffer (which does not need to be very large) can prevent packet loss in most cases. Inside the switch domain, it is not required to have a large guard window around the MPCP discovery slot. The Ethernet switch can prioritize the MAC control protocol type so it doesn't get dropped when shifted in time.

Moreover, by scheduling no other traffic at the same time as the discovery, the scheduler at the bridge can very accurately measure the round trip time to leaf ONUs. The broadcast discovery would find the end node. For those end nodes requiring very tight timing transport, a directed discovery can validate the loop time. The accurate loop time would allow for 802.1AS network timing.

Note that using the modified MPCP control frames to control the upstream traffic consumes bandwidth at the bridge. However, such bandwidth consumption can be small and can be determined by dividing the control frame size over the burst size of the block. Considering the block size of 8K bytes, the bandwidth used by the modified MPCP frames can be around 1%, meaning that the control overhead remains relatively small.

PON Inside the Bridge

When the modified MPCP control frames are used to control the upstream traffic across the Ethernet-switch-equipped bridge, the bridge itself can act as a PON with its upstream traffic to the uplink port controlled by the modified MPCP control frames. One way to implement a PON within the bridge is to have the uplink module (the communication module plugged into the uplink port) include an OLT and the downlink modules (the communication modules plugged into the downlink ports) include ONUs. Considering a downlink module should also include an OLT for the corresponding leaf PON, in some embodiments, the downlink module can be an integrated OLT module that includes a complete OLT (including both the MAC and the transceiver) and an ONU MAC. In other words, when communicating with the leaf PON, the integrated OLT module functions as an OLT, whereas when communicating with the switch, the integrated OLT module functions as a point-to-point node with ONU control.

Figure 4A:
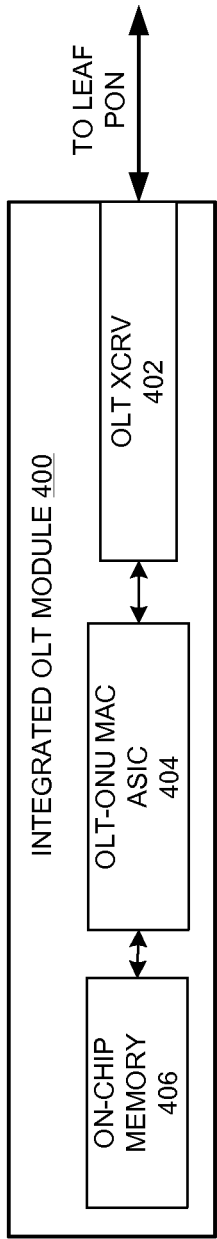
FIG. 4A presents a diagram illustrating an exemplary integrated OLT module, in accordance with an embodiment of the present invention.

FIG. 4A presents a diagram illustrating an exemplary integrated OLT module, in accordance with an embodiment of the present invention. In FIG. 4A, integrated OLT module 400 includes an OLT optical transceiver 402, an ASIC chip 404, and an on-chip memory 406. OLT optical transceiver 402 can be a standard optical transceiver that interfaces with the leaf ONUs. ASIC chip 404 combines the OLT MAC and the ONU MAC into a single integrated chip. On-chip memory 406 can serve as a small data buffer.

On the other hand, to implement a PON in the bridge, the internal components of the bridge should also include an OLT. In some embodiments, the OLT can be part of the uplink module. If the uplink is part of a PON, the uplink port should also include an ONU. In such scenarios, the uplink module can be an integrated ONU module that includes a complete ONU (including both the MAC and the transceiver) and an OLT MAC. In other words, when communicating with the trunk PON, the integrated ONU module functions as an ONU, whereas when communicating with the switch, the integrated ONU module functions as a point-to-point node with OLT control.

Figure 4B:
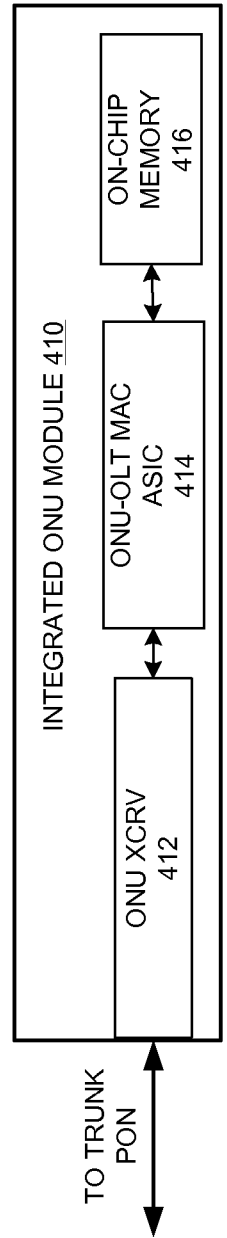
FIG. 4B presents a diagram illustrating an exemplary integrated ONU module, in accordance with an embodiment of the present invention.

FIG. 4B presents a diagram illustrating an exemplary integrated ONU module, in accordance with an embodiment of the present invention. In FIG. 4B, integrated ONU module 410 includes an ONU optical transceiver 412, an ASIC chip 414, and an on-chip memory 416. ONU optical transceiver 412 can be a standard optical transceiver that interfaces with the trunk OLT (which can be located at the central office). ASIC chip 414 combines the OLT MAC and the ONU MAC into a single integrated chip. Similar to on-chip memory 406, on-chip memory 416 can serve as a small data buffer.

Note that both the integrated ONU module and the integrated OLT module can be hot-pluggable modules having standard dimensions and interface, including but not limited to: XENPAK, 10 Gigabit small form-factor pluggable (XFP), small form-factor pluggable (SFP), enhanced small form-factor pluggable (SFP+), quad small form-factor pluggable (QSFP), etc. In some embodiments, the integrated ONU module and the integrated OLT module can be implemented using the same hardware, which can be configured differently based on applications. If the integrated module needs to function as an OLT externally, the transceiver of the integrated module can be configured as the OLT transceiver. On the other hand, if the integrated module needs to function as an ONU externally, the transceiver can be configured as an ONU transceiver.

Figure 5:
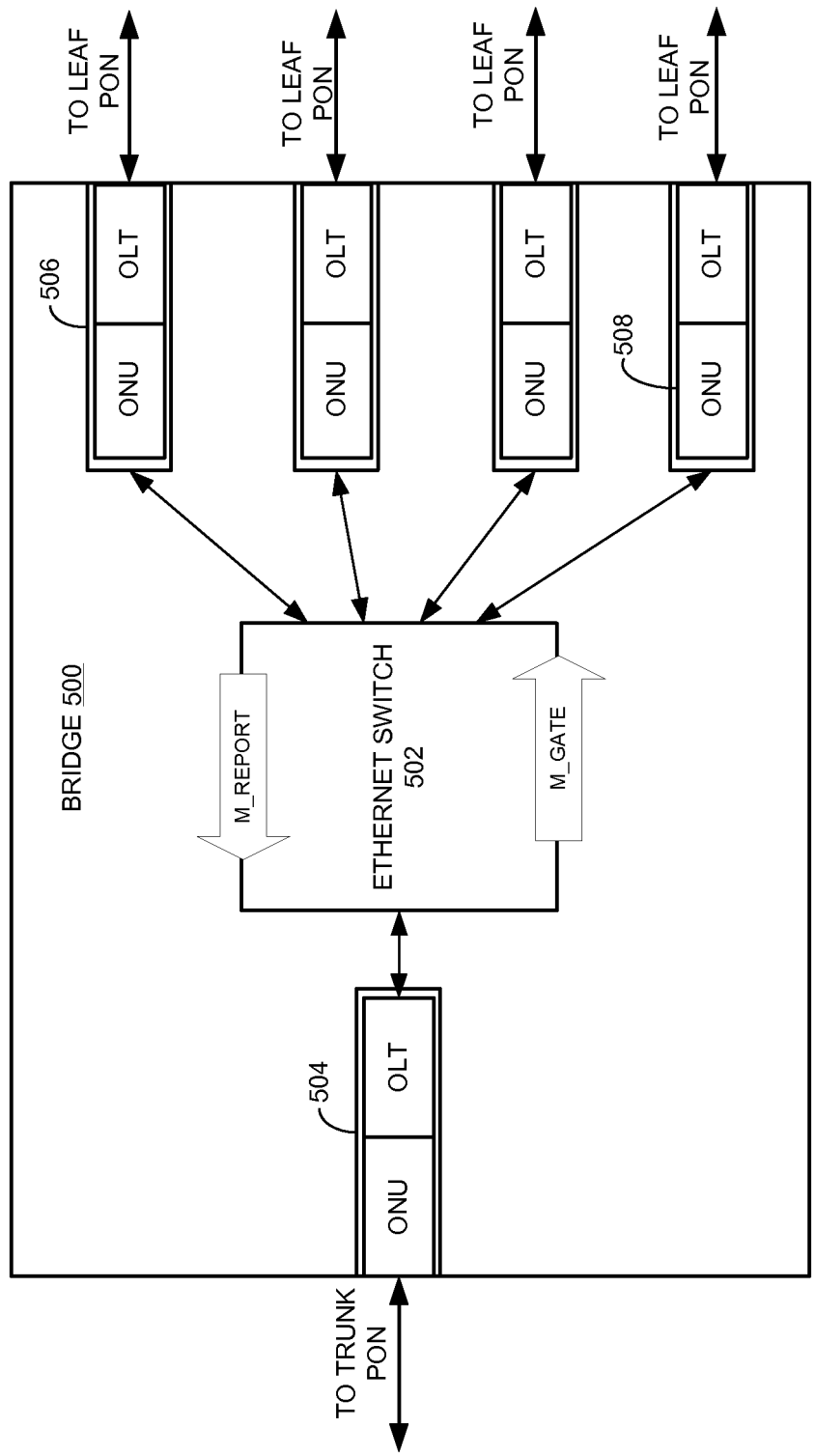
FIG. 5 presents a diagram illustrating an exemplary bridge with an internal Ethernet switch, in accordance with an embodiment of the present invention.

FIG. 5 presents a diagram illustrating an exemplary bridge with an internal Ethernet switch, in accordance with an embodiment of the present invention. In FIG. 5, bridge 500 includes an Ethernet switch 502, an uplink module 504, and multiple downlink modules, such as downlink modules 506 and 508. Uplink module 504 can be an integrated ONU module with the outer side configured as an ONU and the inner side configured for point-to-point mode with OLT control. On the other hand, a respective downlink module, such as downlink module 506, can be an integrated OLT module with its outer side configured as an OLT and the inner side configured for point-to-point mode with ONU control.

In some embodiments, the trunk PON can be a PON with a higher data rate, such as a 10 G EPON, whereas the leaf PONs can include a mixture of lower speed PONs (such as 1 G EPONs) and higher speed PONs (such as 10 G EPONs). Hence, bridge 500 supports the co-existence of the 1 G and 10 G PONs. Moreover, the upstream traffic speed can be configured to be equal to or less than the trunk speed.

As one can see from FIG. 5, the internal structure of bridge 500 is very similar to a conventional PON that has an OLT and multiple ONUs, except that in FIG. 5, instead of a passive optical splitter, the OLT is coupled to the multiple ONUs via the Ethernet switch. Unlike the conventional PON, the OLT and the ONUs within the interior of bridge 500 do not have the PON optics, and frames exchanged between the OLT and the ONUs remain in the electrical domain.

In the downstream direction, the internal OLT (the OLT MAC located within uplink module 504) broadcasts traffic to all downlink modules via Ethernet switch 502. Buffering in the downstream direction is not an issue because the data fans out toward the edge. In the upstream direction, because the upstream module can be oversubscribed, the upstream transmissions may need to be buffered. In some embodiments, the majority of the upstream buffering is performed at the end station (the leaf ONUs), and bridge 500 does not need to provide a large amount of data buffers. Instead, the upstream transmission can be scheduled in such a way that a particular ONU does not transmit upstream unless the uplink port has the bandwidth for such a transmission. The scheduling can be similar to a PON scheduling scheme, in which the ONUs report queue status and the OLT assigns transmission timeslots for the ONUs. In a conventional PON, the scheduling is performed by the OLT. In the example shown in FIG. 5, the scheduling of the upstream transmission is performed by the internal OLT (the OLT MAC located within uplink module 504).

Because the regular MPCP control frame cannot pass through Ethernet switch 502, upstream traffic control within bridge 500 is achieved via modified MPCP frames that are allowed to pass through simple Ethernet switch 502. For example, an ONU within a downlink module can generate a modified REPORT (m_REPORT) frame that indicates the queue status of one or more ONUs in the corresponding leaf PON. In some embodiments, the leaf OLT (the OLT in the downlink module) scheduler selects an LLID in its PON with the most urgent expected-transmission-time and the ONU in the same downlink module can include the most urgent expected-transmission-time in the modified REPORT as the expected-transmission-time for the leaf PON. Such a modified REPORT frame can be forwarded, via Ethernet switch 502, to the upper level OLT (the OLT within uplink module 504). Based on the received REPORT frame, the upper level OLT schedules transmission timeslots for the one or more ONUs, and generates a modified GATE (m_GATE) frame, which indicates the scheduled transmission timeslots. If the modified REPORTs from multiple leaf OLTs include expected-transmission-times, the upper level OLT can select a leaf OLT with the most urgent expected-transmission time from all leaf OLTs to service. In this way, the trunk scheduler can determine which leaf PON needs bandwidth the most. A bandwidth request from a leaf PON with an older time value (the more urgent expected-transmission-time) at the same priority will get serviced first. This allows a leaf PON with many transmitting ONUs to get a larger share of grants over a leaf PON with fewer transmitting ONUs. Considering a scenario that a first leaf PON has only one active ONU and a second leaf PON has ten active ONUs, the first leaf PON will request with a time value and update to a later time, and the second leaf PON will also request with a time value and updates to a later time. The first PON can show the new updated time once its only ONU updates its time (after it transmits), whereas the second PON will continue to show the older time until all of its ten ONUs have updated their times (after all ONUs transmit). In this way, a round robin transmission pattern can be created for the 11 ONUs across the two PONs.

Depending on the format of the modified GATE frame, Ethernet switch 502 may broadcast the modified GATE frame to all internal ONUs, or forward the modified GATE frame to a particular internal ONU (if the LLID of the ONU is carried in the DA field of the modified GATE). Upon receiving a modified GATE for itself, an internal ONU can transmit upstream traffic from the corresponding leaf PON at the timeslot specified by the modified GATE. This arrangement ensures that data is never transmitted from the leaf ONUs unless the uplink port has the bandwidth for such a transmission.

Note that, in the architecture shown in FIG. 5, there are three PON scheduling domains, the trunk PON, the PON inside bridge 500, and the leaf PONs. Although it is possible to have each PON scheduling traffic independently, such a solution can lead to increased delay and jitter. More specifically, scheduling each PON independently means that the polling time from each network will be added together, which can lead to increased delay and jitter. To solve this problem, cascaded switching is performed to coordinate scheduling in the three scheduling domains. By using the cascaded switching, the buffering requirement, jitter, and delay can be reduced significantly. Detailed descriptions of scheduling in a cascaded PON can be found in U.S. patent application Ser. No. 14/684,164, entitled "Method and System for Scheduling Cascaded PON," filed 10 Apr. 2015 by inventor Edward W. Boyd, the disclosure of which is incorporated by reference in its entirety.

In summary, using the cascaded switching scheme and the modified MPCP frames, the OLT in the uplink module can control multiple leaf PONs coupled to the Ethernet switch. When a modified GATE frame is forwarded by the Ethernet switch inside the bridge to a corresponding downlink module, the ONU of the downlink module can decompose the modified GATE frame to extract grant information, and the OLT of the downlink module can generate one or more leaf GATE frames based on the extracted grant information. The leaf GATE frames use parameters that are relative to the leaf PON as if they are issued by a scheduler in the downlink module, although the grants are scheduled by the OLT in the uplink module. Similarly, when leaf ONUs send REPORT frames upstream, the OLT in the downlink module receives the REPORT frames and converts the received REPORT frames using parameters that are relative to the switch PON. The ONU in the downlink module then generates modified REPORTs, and sends the modified REPORTs to the Ethernet switch, which forwards the modified REPORTs to the OLT in the uplink module. Note that REPORT frames from all leaf ONUs are maintained in a single upstream queue, thus preserving the order of the downstream GATEs. A REPORT is removed from the upstream queue only when there is room in the upstream data queue in the bridge. Similar cascading between the trunk PON and the bridge PON can be performed.

Figure 6:
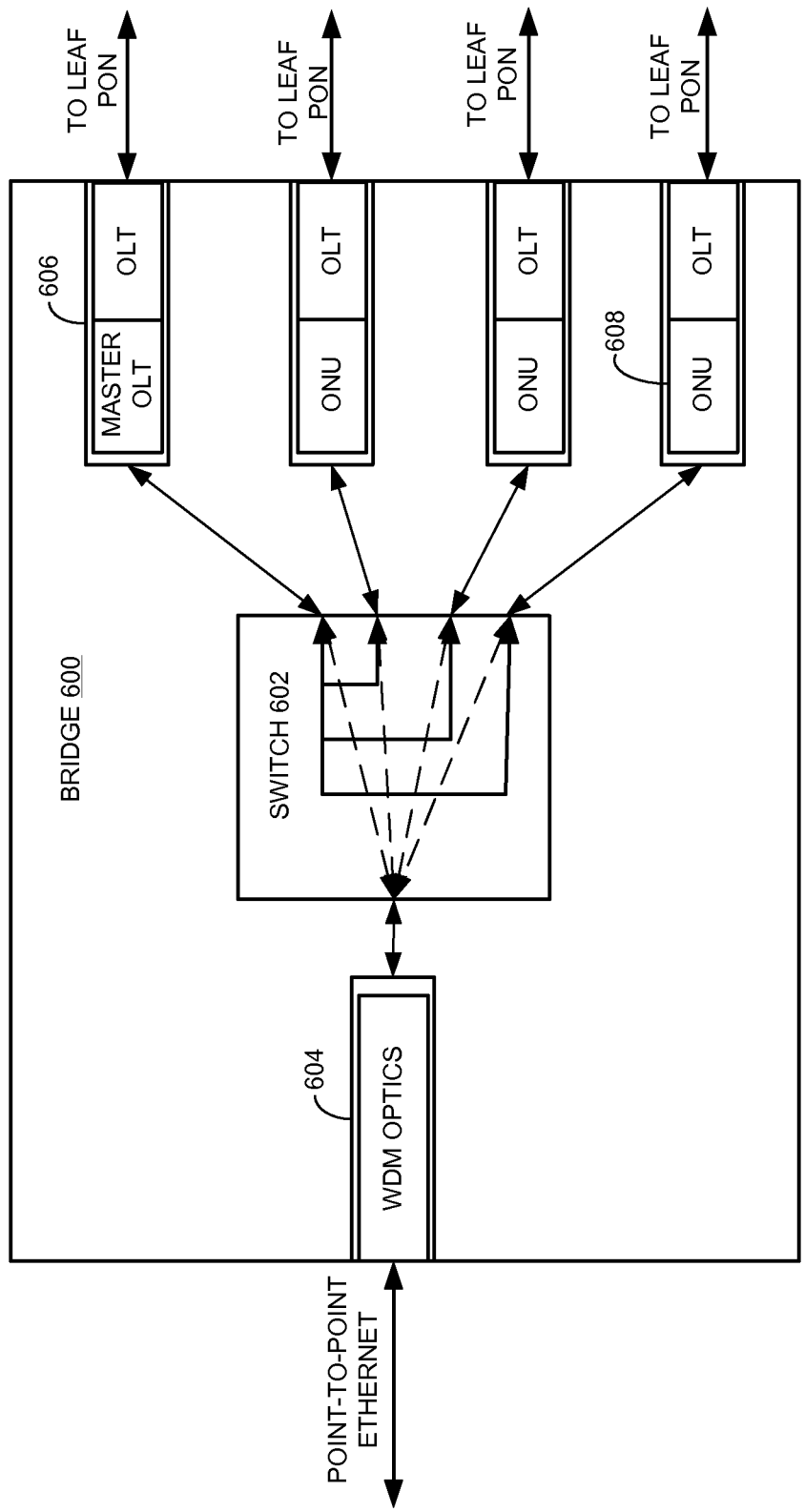
FIG. 6 presents a diagram illustrating an exemplary bridge with an internal Ethernet switch, in accordance with an embodiment of the present invention.

In some embodiments, the uplink to the central office (or the head end) may not be part of a PON, but can include a point-to-point (P2P) connection, such as a P2P Ethernet connection. FIG. 6 presents a diagram illustrating an exemplary bridge with an internal Ethernet switch, in accordance with an embodiment of the present invention. In FIG. 6, bridge 600 includes an Ethernet switch 602, an uplink module 604, and multiple downlink modules, such as downlink modules 606 and 608. The downlink modules are similar to the ones shown in FIG. 5, with each downlink module being part of a corresponding leaf PON. However, unlike the architecture shown in FIG. 5, uplink module 604 shown in FIG. 6 is part of a point-to-point Ethernet connection to the central office. In some embodiments, uplink module 604 can include a WDM transceiver. In further embodiments, the WDM transceiver can be a hot-pluggable module having standard dimensions and interface, including but not limited to: XENPAK, 10 Gigabit small form-factor pluggable (XFP), small form-factor pluggable (SFP), enhanced small form-factor pluggable (SFP+), quad small form-factor pluggable (QSFP), etc.

When the uplink module no longer includes an OLT, implementing a PON within the bridge can be a challenge. To solve this problem, one of the downlink modules can be configured to act as a master for other downlink modules. In the example shown in FIG. 6, downlink module 606 is configured as two OLT modules, with one OLT module facing the inside of bridge 600 and the other (which is a full OLT module equipped with the optical transceiver) facing the outside of bridge 600. The PON inside bridge 600 can include the internal OLT within master downlink module 606, Ethernet switch 602, and the ONUs of the other downlink modules.

The scheduling operation for the system shown in FIG. 6 is similar to that of the system shown in FIG. 5. In FIG. 6, the master OLT (i.e., the internal OLT within master downlink module 606) schedules upstream transmissions for the leaf PONs. More specifically, the master OLT sends modified GATE frames, via Ethernet switch, to ONUs in other downlink modules, and the OLTs within those downlink modules can then use grants included in the modified GATEs to issue GATE frames to corresponding leaf PONs. Based on the grants, the leaf PONs can send upstream data bursts to uplink module 604 via Ethernet switch 602. Because the data bursts from the leaf PONs are scheduled by the master OLT, they will not cause congestion at switch 602 and uplink module 604. Similarly, REPORTs sent from leaf ONUs can be converted using the bridge parameters and then modified in order to pass through the Ethernet switch. The modified REPORTs are then sent to the master OLT by the Ethernet switch. In FIG. 6, the solid double arrows within switch 602 indicate the flow of the MAC control frames (i.e., the modified MPCP control frames), whereas the dashed double arrows indicate the flow of the data.

If every scheduling domain in a cascaded network needed to directly manage the end nodes, the system would not scale. In the case of a 3-stage network (such as the one shown in FIG. 5), a 1:32 PON could be connected to a 1:32 switch with 1:32 PONs on each port. A 32×32×32 network could have 32,678 subscribers. If the trunk network were required to request and grant for all of the 32,678 subscribers, it would consume significant amounts of the network bandwidth. To solve this problem, the scheduling can be performed using LLID aggregation. More specifically, LLIDs in the same class of service from the leaf PON are grouped together as a trunk LLID. Instead of issuing grants to individual leaf LLIDs, a trunk OLT (e.g., the OLT in the uplink module in FIG. 5 or the master OLT in FIG. 6) issues grants to the trunk LLID.

During operation, REPORTs from LLIDs of the same class of service are aggregated to form an aggregated REPORT, and the scheduler of the trunk OLT can issue a single GATE, which can include a relatively large grant, for the aggregated REPORT. The trunk side only sees classes of service (not individual LLIDs) of a leaf PON. Once the GATE is received at the leaf PON, individual grants can be extracted from the GATE and sent to the individual LLIDs. Because the MAC control frames are now local to the network of each stage, the control frames are limited to a reasonable amount.

Note that with LLID aggregation, the queue status values reported from a leaf OLT to the trunk OLT are aggregated by class of service. In other words, LLIDs of the same class of service sends a single report. When the expected-transmission-time is included in the report, the oldest expected-transmission-time for all LLIDs within the class of service is set as the expected-transmission-time for the entire class of service. This way the upper level scheduler is able to understand the fairness among the OLTs after the LLID aggregation.

Figure 7:
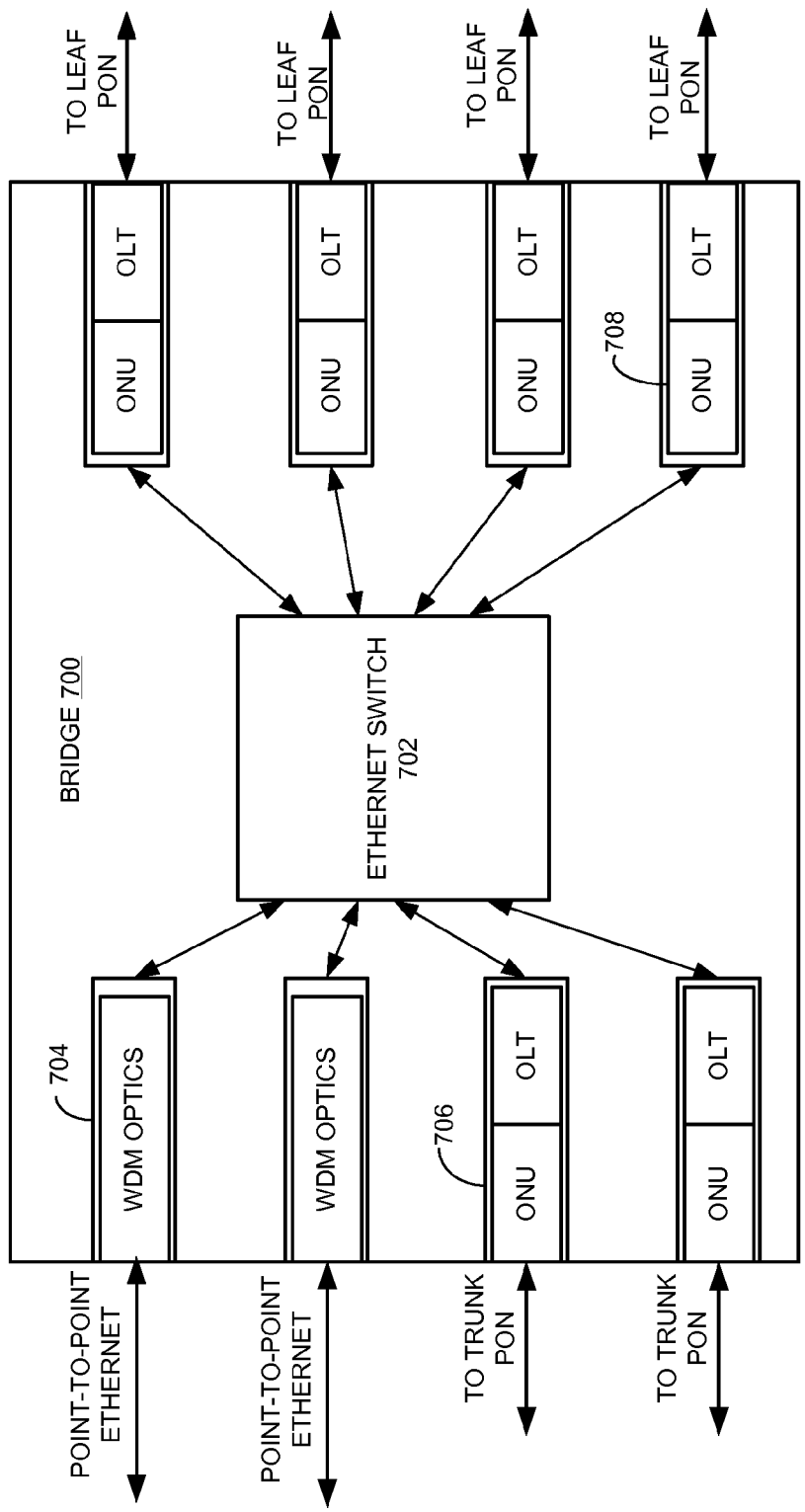
FIG. 7 presents a diagram illustrating an exemplary bridge with an internal Ethernet switch, in accordance with an embodiment of the present invention.

In the example shown in FIGS. 5 and 6, the bridge only includes one uplink port, which provides 1:N connectivity at the bridge. In practice, N:N connectivity at the bridge can be achieved with multiple uplink ports. FIG. 7 presents a diagram illustrating an exemplary bridge with an internal Ethernet switch, in accordance with an embodiment of the present invention. In FIG. 7, bridge 700 includes an Ethernet switch 702, multiple uplink modules (e.g., uplink modules 704 and 706), and multiple downlink modules (e.g., downlink module 708).

The multiple uplink modules can include one or more integrated ONU modules (e.g., module 706) or one or more WDM transceivers (e.g., module 704). The WDM transceiver can be part of the point-to-point Ethernet link, and the integrated ONU modules can be part of the trunk PON network. The number of the uplink ports and the number of the downlink ports can be the same or different. Each of the uplink ports can be connected to one or more downlink ports via Ethernet switch 702, and configuration of port-based VLANs on the switch can be used for this function. Moreover, it is also possible to create the grouping based on the configuration of the MAC addresses of the downlink modules of the MPCP control frames.

As one can see from FIG. 7, the uplink and downlink ports of bridge 700 are coupled to pluggable modules that implement the PON OLT and ONU functions. As a result, simple Ethernet switch 702 is the only fixed component within bridge 700. This modular solution allows for a low initial cost and significant flexibility on the number of the leaf PONs and the uplink trunks. In the example shown in FIG. 7, there are 4 uplink modules and 4 downlink modules plugged into the ports. In practice, any port on bridge 700 can be configured as either an uplink port (with an uplink module plugged in) or a downlink port (with a downlink module plugged in). In other words, although the total number of ports can be fixed for a bridge, the bridge can have any number of uplink modules or downlink modules plugged in until all ports are filled. For example, a same 8 port bridge may be configured to have 1 uplink ports and 4 downlink ports, or it may be configured to have 2 uplink ports and 6 downlink ports. The majority cost of the bridge is within the pluggable modules, so it scales with the bandwidth and subscriber count. As the number of subscribers grows, more pluggable modules can be plugged in the bridge. Note that, in the upstream direction, the trunk speed is equal to or greater than the upstream traffic speed. For example, if the trunk bandwidth is 10 G (e.g., the trunk being a 10 G EPON), the bandwidth of the upstream traffic can be configured to be 10 G or less than 10 G.

In general, employing a bridge device between a trunk side network (which can include one or more uplink trunks) and the leaf networks allows a trunk scheduler (which can be a scheduler located in the bridge) to control the per-custom per-service buffers at the edge of the network, i.e., the leaf ONUs. Instead of concentrated buffering at the switch, upstream traffic is buffered at the edge of the network and is transmitted upstream only when the trunk scheduler schedules transmission bandwidth for the leaf ONU. This allows for better buffer scaling. Moreover, by using modified MPCP control frames for upstream traffic control (which, like MPCP, only allows one transmitter to send packet upstream through the switch at a time), the bridge is able to use a simple Ethernet switch with a limited buffer without packet loss.

In addition to bridging between a trunk side network (which connects the central office and an outside plant) and a plurality of leaf networks, the solution disclosed here can also be used inside the central office to aggregate many customers (which can belong to different PONs) into a single port. More specifically, the central office can use a low-cost, low-power switch to aggregate multiple PONs into a single port. In such scenarios, the uplink can be an Ethernet cable or a non-WDM optical fiber. Additional applications also include placing a low-cost Ethernet switch chip on an Ethernet line card in the central office to allow for a low-cost first stage of aggregation.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. An apparatus for coupling a trunk network to a plurality of leaf passive optical networks (PONs), comprising:
   one or more uplink ports for coupling to the trunk network;
   a plurality of downlink ports; and
   an Ethernet switch chip for interconnecting the uplink ports and the downlink ports;
   wherein a respective downlink port includes a pluggable downlink module comprising a downlink optical transceiver and a downlink media access control (MAC) module, wherein the downlink optical transceiver is coupled to a leaf PON, and wherein the downlink MAC module is configured to:
      receive a multi-point control protocol (MPCP) control frame from the leaf PON, wherein a preamble field of the MPCP control frame includes a logical link identifier (LLID) associated with the leaf PON;
      generate a VLAN-tagged Ethernet frame based on the received MPCP control frame, which involve placing the LLID into a VLAN tag field of the VLAN-tagged Ethernet frame; and
      forward the VLAN-tagged Ethernet frame to the Ethernet switch chip.

2. The apparatus of claim 1, wherein a respective uplink port includes a pluggable uplink module comprising an uplink optical transceiver and an uplink MAC module, wherein the uplink optical transceiver is coupled to the trunk network, and wherein the uplink MAC module is configured to receive the VLAN-tagged Ethernet frame from the Ethernet switch chip.

3. The apparatus of claim 2, wherein the uplink MAC module is configured to schedule upstream traffic for the leaf PON based on the VLAN-tagged Ethernet frame.

4. The apparatus of claim 1, wherein the pluggable downlink module further comprises an on-chip memory.

5. The apparatus of claim 1, wherein a respective uplink port includes a pluggable optical transceiver module, wherein the pluggable optical transceiver module is coupled, via the Ethernet switch chip, to multiple pluggable downlink modules plugged into multiple downlink ports, and wherein a pluggable downlink module acts as a master over other pluggable downlink modules.

6. The apparatus of claim 5, wherein a MAC module of the master downlink module is configured to:
  receive the VLAN-tagged Ethernet frame from the Ethernet switch chip; and
  schedule upstream traffic for the leaf PON based on the VLAN-tagged Ethernet frame.

7. The apparatus of claim 1, wherein the trunk network includes one or more of:
  a point-to-point Ethernet link between a central office and an outside plant;
  a PON between a central office and an outside plant; and
  a link within a central office.

8. The apparatus of claim 1, wherein the simple Ethernet switch chip is configured to switch the VLAN-tagged Ethernet frame based on one of:
  a multicast destination address included in the VLAN-tagged Ethernet frame; and
  a unicast destination address included in the VLAN-tagged Ethernet frame.

9. The apparatus of claim 8, wherein the VLAN-tagged Ethernet frame has an Ethertype that is different from an Ethertype of the MPCP control frame.

10. The apparatus of claim 8, wherein the unicast destination address includes a logical link identifier (LLID) associated with a pluggable downlink module coupled to a downlink port.

11. The apparatus of claim 8, wherein the VLAN-tagged Ethernet frame includes a bandwidth request sent from the leaf PON, and wherein the VLAN-tagged Ethernet frame includes a time field that indicates an expected-transmission time associated with the bandwidth request.

12. A cascaded network, comprising:
  a trunk network;
  a plurality of leaf passive optical networks (PONs); and
  a bridge coupling the trunk network to the leaf PONs, wherein the bridge comprises:
    one or more uplink ports coupled to the trunk network;
    a plurality of downlink ports; and
    an Ethernet switch chip for interconnecting the uplink ports and the downlink ports;
    wherein a respective downlink port includes a pluggable downlink module comprising a downlink optical transceiver and a downlink media access control (MAC) module, wherein the downlink optical transceiver is coupled to a leaf PON, and wherein the downlink MAC module is configured to:
      receive a multi-point control protocol (MPCP) control frame from the leaf PON, wherein a preamble field of the MPCP control frame includes a logical link identifier (LLID) associated with the leaf PON;
      generate a VLAN-tagged Ethernet frame based on the received MPCP control frame, which involve placing the LLID into a VLAN tag field of the VLAN-tagged Ethernet frame; and
      forward the VLAN-tagged Ethernet frame to the Ethernet switch chip.

13. The cascaded network of claim 12, wherein a respective uplink port includes a pluggable uplink module comprising an uplink optical transceiver and an uplink MAC module, wherein the uplink optical transceiver is coupled to the trunk network, and wherein the uplink MAC module is configured to receive the VLAN-tagged Ethernet frame from the Ethernet switch chip.

14. The cascaded network of claim 13, wherein the uplink MAC module is configured to schedule upstream traffic for the leaf PON based on the VLAN-tagged Ethernet frame.

15. The cascaded network of claim 12, wherein the pluggable downlink module further comprises an on-chip memory.

16. The cascaded network of claim 12, wherein a respective uplink port includes a pluggable optical transceiver module, wherein the pluggable optical transceiver module is coupled, via the Ethernet switch chip, to multiple pluggable downlink modules plugged into multiple downlink ports, and wherein a pluggable downlink module acts as a master over other pluggable downlink modules.

17. The cascaded network of claim 16, wherein a MAC module of the master downlink module is configured to:
  receive the VLAN-tagged Ethernet frame from the Ethernet switch chip; and
  schedule upstream traffic for the leaf PON based on the VLAN-tagged Ethernet frame.

18. The cascaded network of claim 12, wherein the trunk network includes one or more of:
  a point-to-point Ethernet link between a central office and an outside plant;
  a PON between a central office and an outside plant; and
  a link within a central office.

19. The cascaded network of claim 12, wherein the Ethernet switch chip is configured to switch the VLAN-tagged Ethernet frame based on one of:
  a multicast destination address included in the VLAN-tagged Ethernet frame; and
  a unicast destination address included in the VLAN-tagged Ethernet frame.

20. The cascaded network of claim 19, wherein the VLAN-tagged Ethernet frame has an Ethertype that is different from an Ethertype of the MPCP control frame.

21. The cascaded network of claim 19, wherein the unicast destination address includes a logical link identifier (LLID) associated with a pluggable downlink module coupled to a downlink port.

22. The cascaded network of claim 19, wherein the VLAN-tagged Ethernet frame includes a bandwidth request sent from the leaf PON, and wherein the VLAN-tagged Ethernet frame includes a time field that indicates an expected-transmission time associated with the bandwidth request.

* * * * *